Aug. 22, 1961 T. A. CIARLARIELLO 2,997,517
FUEL CELL OPERATION
Filed April 22, 1960 2 Sheets-Sheet 1

INVENTOR.
THOMAS A. CIARLARIELLO
BY
Brown, Critchlow, Flick & Peckham
HIS ATTORNEYS

INVENTOR.
THOMAS A. CIARLARIELLO

2,997,517
FUEL CELL OPERATION
Thomas A. Ciarlariello, Evans City, Pa., assignor to M.S.A. Research Corp., Pittsburgh, Pa., a corporation of Pennsylvania
Filed Apr. 22, 1960, Ser. No. 23,944
9 Claims. (Cl. 136—86)

This invention relates to fuel cells, and in particular it is concerned with the operation of those cells in the substantial absence of a gravitational force.

A wide variety of fuel cells has been disclosed in the art. For example, among the known cells are the hydrogen-oxygen cell, a molten salt cell in which a carbonaceous gas and air react, a redox cell in which hydrogen and coal react, and a regenerative cell in which the product of reaction of the electrodes is thermally decomposable to regenerate the electrode materials. In the majority of the cells disclosed to date, at least two and frequently all three of the essential components are in the fluid state at operating conditions. For example, in regenerative cells it is not uncommon that one electrode is gaseous, one is a liquid metal and the electrolyte is a molten salt.

Under ordinary conditions of operation, the physical state of the various components in a cell, whether they be liquid, gaseous or solid, poses no particular problems. Under unusual conditions, however, such as the tilting or the rotation of a cell, or in the substantial absence of gravitational forces, the possibility of shortcircuiting the cell arises. This would occur where the electrode materials come into direct contact with one another.

It is therefore a primary object of the present invention to provide fuel cells containing at least two fluids among their essential operating elements, which fuel cells can be effectively operated without regard to unusual physical effects such as the substantial absence of gravitational effects.

This and other objects are attained in accordance with my discoveries in fuel cells in which at least one of the electrodes and the electrolyte are in a fluid state and the electrolyte is more dense than any other fluid present, by subjecting at least the electrolyte to centrifugal force during cell operation. In that manner the electrolyte functions to keep the electrodes out of contact with one another, prevents mixing of the electrodes and the electrolyte but insures contact between the electrodes and the electrolyte. Accordingly, the cell can be successfully operated without regard to unusual conditions as, for example, the absence of gravity.

The invention will be described in detail in conjunction with the attached drawings in which.

Figure 1:
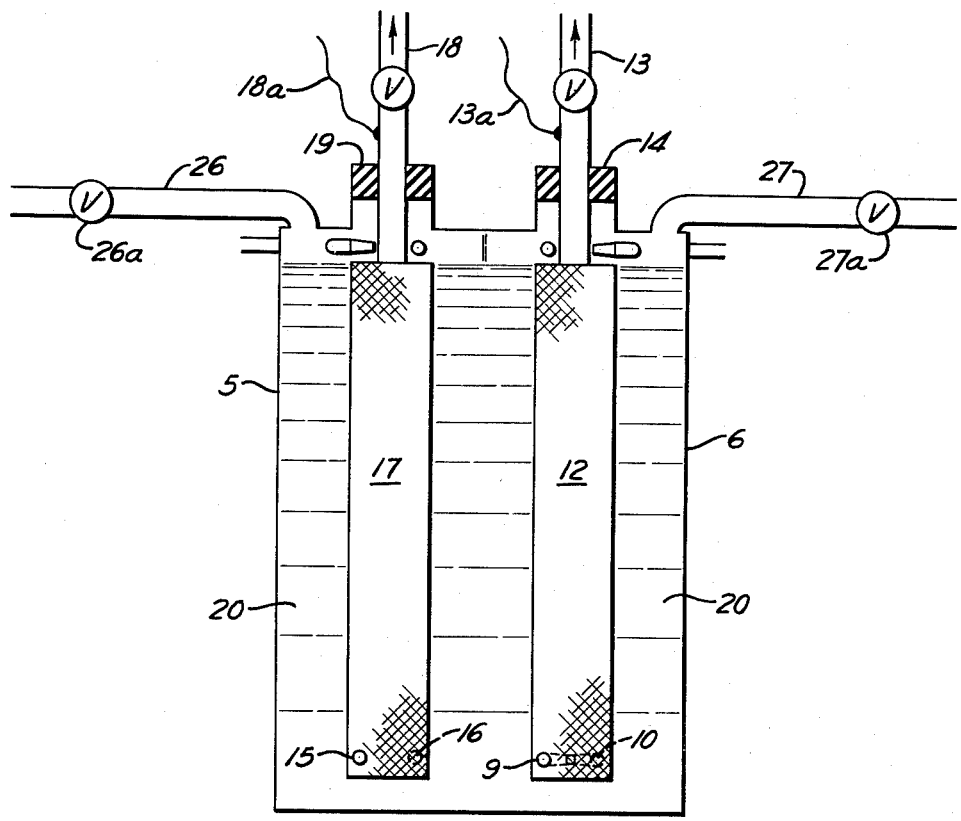
FIG. 1 is a diagrammatic representation of a fuel cell in accordance with the present invention.
Figure 2:
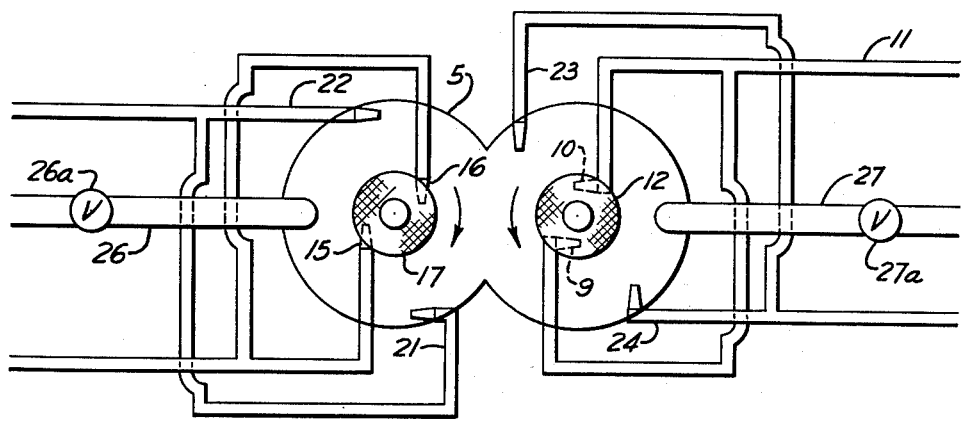
FIG. 2 is a top plan view of the cell of FIG. 1.

The specific embodiment of a fuel cell described in accordance with the structure shown in the drawings will be a thermally regenerative lithium hydride cell. Such a cell is composed of a hydrogen cathode, a liquid lithium anode and an electrolyte that can be the eutectic mixture of lithium chloride and lithium fluoride. It should be understood, however, that this cell is disclosed by way of illustration and not by way of limitation.

Referring now to the drawing, the numerals 5 and 6 indicate hollow cylindrical members laterally intersecting along a line 7. A longitudinal segment of each cylinder is cut away, and the resulting members are joined, as by welding or the like, to make the structure shown. Considering the operation of the cells as hereinafter described, it will be appreciated that the degree of intersection is not critical to the operability of the invention. However, as shown, open communication of the inside of the cylinders with each other is required.

The electrodes for a lithium hydride cell are a gaseous hydrogen cathode and liquid lithium as the anode. The cathode is introduced into the cell of FIG. 1 through nozzles 9 and 10, suitably near the bottom of an elongated generally cylindrical metal mesh 12 that is placed along the central axis of cylinder 6. These nozzles may be served by a common source through a conduit 11. A tank of hydrogen under pressure, not shown, constitutes a suitable source of cathode. The mesh electrode 12 facilitates contact between the cathode and the electrolyte by dispersing the hydrogen thereby increasing its surface area; it also facilitates making contact between the cathode and the external circuit (not shown). Excess hydrogen, if any, passes out of the cell through metal conduit 13 in the upper portion of the cell. The metal conduit 13 conveniently acts as the terminal to which the cathode is connected through electrical lead 13a to the external circuit that utilizes power developed in the cell. Conduit 13 is spaced from cylinder 6 by an insulating plug 14 which also serves to seal the cylinder.

The lithium anode is introduced from a source, not shown, into the cell through supply nozzles 15 and 16 which lead to a second mesh electrode 17, this being located in cylinder 5. Excess lithium, if any, is withdrawn through the outlet metal conduit 18 in the top end wall of cylinder 6. Here, too, conduit 18 is centrally positioned by an insulating plug 19 that serves as a sealing member for the cylinder 5. Electrical lead 18a is attached to metal conduit 18 so that the anode may be connected to an external circuit.

The electrolyte 20, e.g. the eutectic of lithium chloride and lithium fluoride, or other electrolyte having a higher density than that of either electrode, substantially fills the remaining volume of the two cylindrical members 5 and 6. The electrolyte is supplied through electrolyte inlet nozzles 21, 22, 23, and 24. While four such nozzles are shown, it will be appreciated that any number of them can be used depending on the desires of the operator. Preferably, these nozzles are angled to provide tangential injection of the electrolyte. Electrolyte can be withdrawn from the cell through outlet conduits 26 and 27, controlled by valves 26a and 27b respectively.

In practicing the invention, a cell structure of the type disclosed is provided with lithium flowing into the anode mesh 17 and hydrogen flowing into electrode mesh 12. Then the electrolyte is tangentially injected into the system at a sufficiently rapid rate and with a force adequate to keep it rotating within the system. Under these conditions of operation, the electrolyte will tend to form an annular wall in each of the cylinders, yet is free to move from cylinder to cylinder. The electrodes, also rotating about their axis as a consequence of force applied by the rotating electrolyte or as a consequence of tangential injection of these materials, or for both of these reasons, will form annular columns along the inside surface of the electrolyte in each chamber. Since the electrode materials are lighter than the electrolyte, it is evident that the wall of electrolyte will be substantially impenetrable by the lighter electrodes. Hence the electrodes will be maintained out of contact with one another notwithstanding the absence of such ordinary forces such as gravity.

By applying centrifugal force by tangential injection of one or more of the fluids, the motion imparted to the fluids is maintained so long as an adequate tangential force is applied and excess fluids are withdrawn. Hence, operation of the cell is naturally of a continuous nature. In instances where impellers are provided to rotate the fluids, it is apparent that operation can also be continuous.

Figure 3:
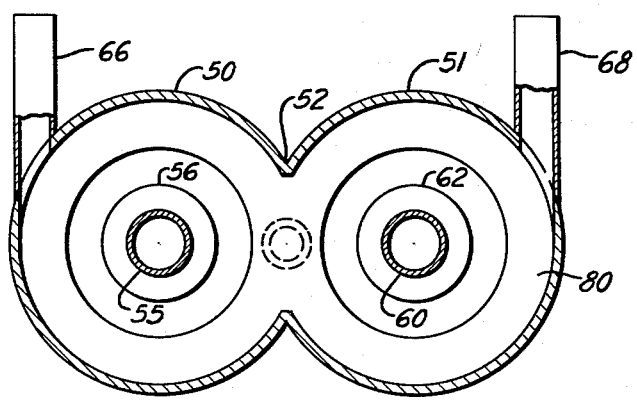
FIG. 3 is a sectional view of the cell of FIG. 4.
Figure 4:
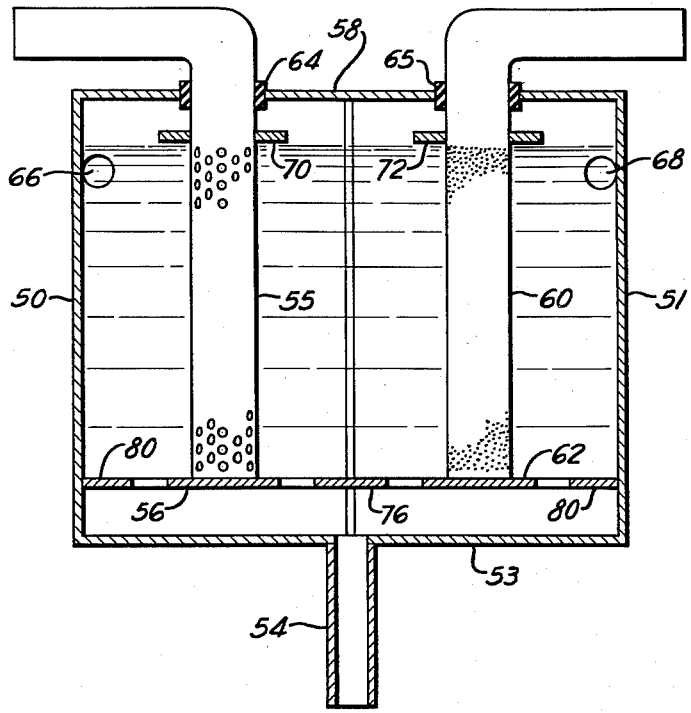
FIG. 4 shows a second embodiment of a fuel cell in accordance with the invention.

Referring now to FIGURES 3 and 4, there is shown another and preferred embodiment of apparatus of this invention. The structure comprises a pair of hollow cylinders 50 and 51 joined along a longitudinal lateral section 52, as before. Centrally located in the lower end 53 of the joined cylinders is an electrolyte outlet conduit 54.

The electrodes are centrally located in each of the two chambers. A perforated tube 55 closed at its lower end by a plate 56, and extending out of the top end wall 58 of chamber 50 serves as the anode container, for example, lithium metal container. A porous tube 60 closed on its lower end by a plate 62 and extending upwardly out of the top end wall 58 of chamber 51 serves as the cathode or hydrogen electrode. Each of these electrode tubes are mounted in the top end wall 58 by suitable means 64 and 65 to provide fluid tight engagement.

Electrolyte is introduced into the chambers 50 and 51 by separate inlet conduits 66 and 68 respectively (FIG. 3). These are arranged so that tangential injection is achieved and the resulting motion of the electrolyte in one chamber is clockwise and is counter-clockwise in the other chamber.

About the upper end of the anode tube 55 is a baffle member 70. A similar baffle member 72 is placed around the upper end of the cathode tube 60. These baffle members are preferably located above the level of the electrolyte inlet conduits 66 and 68. An additional baffle plate 76 is located in the horizontal plane of the lower end members 56 and 62 of the electrode tubes. Baffle plate 76 extends around the side walls of each of the chambers as is shown at the numeral 80.

The end plate 56 and top baffle 70 about the anode tube serve to contain the liquid metal and to prevent undue axial expansion thereof. Similarly end plate 62 and baffle 72 serve to retain the hydrogen (gas) electrode. However, where a flushing action of the hydrogen electrode is desired, the lower end plate 62 is omitted.

In operation the electrolyte enters tangentially near the top of the cylindrical members 50 and 51. The electrolyte sets up two rotating columns of liquid with a center of rotation in each half of the cell, but essentially filling both chambers thereby providing the desired electrical and ionic communication between the chambers. The electrodes are supplied to the porous tube 60 and perforated tube 55, hydrogen going to the latter and liquid metal, e.g. lithium, to the former. It will be noted that in the embodiment of FIG. 4, the electrodes are more or less static; after the initial electrode charge is made, flow occurs only to replenish electrode materials consumed in cell operation. Of course, the electrode constituents may rotate as a consequence of motion imparted primarily by the rotating electrolyte and secondarily as by angled injection of the electrodes. It will be evident that the electrodes are kept separated by the centrifugal field of the electrolyte. The baffle near the bottom of each of chambers 50 and 51 provides a center of rotation for the electrolyte in each chamber. Since the electrolyte enters relatively far from the center and leaves at the center, an increased centrifugal force will be present at the exit.

The characteristics of cell operation in accordance with the embodiment shown in FIGURES 3 and 4 are as follows: Consider a cell with a one and one-half inch radius in each of the two chambers, a ¾ inch radius for the hydrogen tube and for the lithium tube, an effective length of 6 inches, two 0.4 inch electrolyte injection nozzles and two discharge openings at the lower end baffle with an area of 0.3 sq. inch. In such a cell, with each inlet nozzle carrying two gallons per minute of electrolyte, the nozzle velocity will be 5.1 feet per second and the centrifugal force at the nozzle will be 6.46 g's. Under these conditions, the pressure drop through the cell will be on the order of 5.2 p.s.i. Accordingly, the cell is capable of separating gas particles smaller than 16.2 microns and liquid particles smaller than 18.7 microns.

The application of the principles of this invention is dependent on the state and mass of the materials used and is independent of chemical composition. Accordingly, it is evident that this invention is of generic application and can be applied to cells in general without regard to the actual chemical constitution of the electrodes and the electrolytes as long as the electrolyte and at least one electrode are fluids and the electrolyte is more dense than any other fluid present.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:
1. In the operation of a fuel cell comprising two spaced electrodes and an electrolyte wherein the electrolyte and at least one electrode are in a fluid state and in which the electrolyte is more dense than any other fluid present at the cell operating temperature, the steps of preventing direct contact of said electrodes comprising subjecting said electrolyte to a centrifugal force that is at least as great as any similar force applied to either of said electrodes and maintaining the resulting wall of electrolyte between said electrodes, whereby said electrolyte prevents contact of said electrodes.

2. In the operation of a fuel cell comprising a chamber divided into two zones that are in open communication with one another, and where each of said zones contains an electrode and at least one of said electrodes is fluid, the method of preventing direct physical contact between said electrodes during cell operation which comprises feeding to said chamber an electrolyte that is in the fluid state and is of greater density than any other fluid present, and subjecting said electrolyte in said chamber to centrifugal force whereby the electrolyte forms, in each of said zones, a barrier to the passage of either of said electrodes from its zone to the other of said zones.

3. A method of operating a cell in accordance with claim 2 in which said electrolyte is tangentially injected into said chamber thereby to impart centrifugal force to said electrolyte.

4. A cell comprising a chamber defining two zones in open communication with one another, an electrode in each of said zones, at least one of said electrodes being in the fluid state, and a fluid electrolyte that is more dense than any other fluid present, and means to impart centrifugal force to said electrolyte in said zones of said chamber.

5. A cell in accordance with claim 4 in which each of said zones has a lateral side wall that conforms to a portion of the inside surface of a hollow cylinder.

6. Apparatus in accordance with claim 5 including nozzles extending into each of said zones of said chamber.

7. Apparatus in accordance with claim 6 in which said nozzles are tangentially angled into said zones of said cylinders.

8. A cell comprising a chamber defining two zones in open communication with one another, each of said zones having a side wall that conforms to a portion of the inside surface of an elongated hollow cylinder, a first hollow metal pervious electrode tube located in one of said zones, and a second hollow metal pervious tube located in the other of said zones, inlet means communicating with each of said tubes, and a nozzle extending into each of said zones of said chamber to inject electrolyte therein, said nozzles being angled tangentially into said chamber and in opposed relationship to one another whereby electrolyte is provided with clockwise motion in one chamber and counterclockwise motion in the other chamber, and an outlet conduit from said chamber.

9. A cell structure in accordance with claim 8 in which each of said tubes is provided with a plate covering one end thereof and extending beyond said tubes, and baffle members surrounding the other ends of said tubes, whereby axial movement of electrode material leaving said tubes is restricted.

References Cited in the file of this patent

UNITED STATES PATENTS

| | | |
|---|---|---|
| 719,661 | Halsey | Feb. 3, 1903 |
| 2,921,110 | Crowley et al. | Jan. 12, 1960 |

OTHER REFERENCES

Status Report on Fuel Cells, U.S. Dept. of Commerce Office of Technical Services, PB-151804, B. R. Stein, A.R.O. Report No. 1, June 1959, page 23.